(12) United States Patent
Sipprell (10) Patent No.: US 12,091,184 B2
(45) Date of Patent: Sep. 17, 2024

(54) FUEL TANK INERTING SYSTEM

(71) Applicant: Eaton Intelligent Power Limited, Dublin (IE)

(72) Inventor: Stephen E. Sipprell, Mission Viejo, CA (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 596 days.

(21) Appl. No.: 17/337,697

(22) Filed: Jun. 3, 2021

(65) Prior Publication Data

US 2021/0380269 A1 Dec. 9, 2021

Related U.S. Application Data (60) Provisional application No. 63/035,221, filed on Jun. 5, 2020.

(51) Int. Cl.
| | | |
|---|---|---|
| *B64D 37/32* | (2006.01) | |
| *B64D 13/02* | (2006.01) | |
| *B64D 13/08* | (2006.01) | |
| *B64C 30/00* | (2006.01) | |
| *B64D 13/06* | (2006.01) | |

(52) U.S. Cl.
CPC ............ *B64D 37/32* (2013.01); *B64D 13/02* (2013.01); *B64D 13/08* (2013.01); *B64C 30/00* (2013.01); *B64D 2013/0659* (2013.01); *B64D 2037/325* (2013.01)

(58) Field of Classification Search
CPC .. B64D 37/32; B64D 2037/325; B64D 13/02; B64D 13/08; B64D 2013/0659; B64C 30/00

USPC .......................................................... 454/69
See application file for complete search history.

(56) References Cited

U.S. PATENT DOCUMENTS

| | | | |
|---|---|---|---|
| 6,830,219 B1 | 12/2004 | Picot et al. | |
| 6,997,970 B2 | 2/2006 | Crome | |
| 7,007,893 B2 | 3/2006 | Loss et al. | |
| 7,152,635 B2 | 12/2006 | Moravec et al. | |
| 7,172,156 B1 * | 2/2007 | Jones ..................... | B64D 37/32 96/155 |
| 7,273,507 B2 * | 9/2007 | Schwalm ............... | B64D 37/32 55/467 |

(Continued)

FOREIGN PATENT DOCUMENTS

| | | |
|---|---|---|
| EP | 1250259 A1 | 10/2002 |
| EP | 2965992 A1 | 1/2016 |

OTHER PUBLICATIONS

Faa: "DOT/FAA/AR-04/8 Limiting Oxygen Concentration Required to Inert Jet Fuel Vapors Existing at Reduced Fuel Tank Pressures—Fina l Phase", Aug. 23, 2004 (Aug. 23, 2004), pp. 1-43, XP055722557, Washington, D.C. Retrieved from the Internet: URL:https://www.fire.tc.faa.gov/pdf/04-8.pdf [retrieved on Aug. 14, 2020].

*Primary Examiner* — Avinash A Savani
*Assistant Examiner* — Dana K Tighe
(74) *Attorney, Agent, or Firm* — Merchant & Gould P.C.

(57) ABSTRACT

A fuel tank inerting system includes a cabin air source, a conduit, a heat exchanger, and a pressurized air source. In embodiments, the pressurized air source is configured to provide pressurized air to the heat exchanger, and the conduit is configured to provide cabin air from the cabin air source to the heat exchanger.

29 Claims, 8 Drawing Sheets

(56) References Cited

U.S. PATENT DOCUMENTS

| | | | | |
|---|---|---|---|---|
| 7,302,804 B2* | 12/2007 | Murry | ............. | H02K 9/12 |
| | | | | 62/401 |
| 7,306,646 B2* | 12/2007 | Wong | ............. | B01D 53/22 |
| | | | | 95/45 |
| 8,015,838 B2* | 9/2011 | Lippold | ............. | F04D 27/02 |
| | | | | 62/401 |
| 8,074,932 B2 | 12/2011 | Surawski | | |
| 9,505,500 B2* | 11/2016 | Vigliotta | ............. | B64D 37/32 |
| 9,908,635 B2* | 3/2018 | Snyder | ............. | F01D 13/00 |
| 10,640,227 B2* | 5/2020 | Smith | ............. | B64D 37/32 |
| 2011/0256042 A1 | 10/2011 | Tichborne et al. | | |
| 2012/0193479 A1 | 8/2012 | Roscoe et al. | | |
| 2013/0091850 A1* | 4/2013 | Francisco | ............. | F02C 7/32 |
| | | | | 60/39.83 |
| 2014/0345700 A1* | 11/2014 | Surawski | ............. | G05D 9/00 |
| | | | | 137/12 |
| 2015/0041011 A1 | 2/2015 | Tiger | | |
| 2017/0305576 A1* | 10/2017 | Al-Yafawi | ............. | B64D 37/32 |
| 2018/0094557 A1 | 4/2018 | Zopey et al. | | |
| 2019/0283897 A1* | 9/2019 | D'Orlando | ............. | B64D 13/06 |
| 2021/0188456 A1* | 6/2021 | Ho | ............. | B64D 37/32 |

\* cited by examiner

FUEL TANK INERTING SYSTEM

CROSS-REFERENCE TO RELATED APPLICATION

This application claims the benefit of U.S. Provisional Patent Application Ser. No. 63/035,221, filed on Jun. 5, 2020, the disclosure of which is hereby incorporated by reference in its entirety as though fully set forth herein.

TECHNICAL FIELD

The present disclosure generally relates to aircraft fuel tank inerting systems, particularly but not exclusively to an inerting system for fixed wing aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

In aircraft, the fuel is often stored in tanks in a wing. Aircraft fuel tanks are commonly required to include an "inerting system" to, among other things, help reduce flammable gas within the ullage space which exists above the fuel within each fuel tank. For example, without limitation, inerting systems may comprise a system in which Nitrogen Enriched Air (NEA) is generated by an On Board Inert Gas Generating System (OBIGGS) which is then pumped into the fuel tanks. Such systems can reduce the flammable oxygen content of the fuel tank.

Additionally, supersonic aircraft can present certain additional thermal management challenges for aircraft systems that require cooling, particularly while at supersonic speeds. Such fuel tank inerting systems may involve or require cooling of compressed air prior to the compressed air entering the air separation modules. With supersonic flight, ambient ram air must be slowed down to subsonic speeds before it enters the heat exchanger. The slowing of the air can, among other things, increase the temperature of the air and thereby reduce its ability to cool the heat exchangers. The resulting higher cooling air temperature, commonly requires a higher mass flow to achieve the same or a similar measure of source air cooling. The higher mass flow may result in increased aircraft drag, as well as a reduction in overall aircraft performance and efficiency.

Consequently, there is a desire for solutions/options that address one or more of the aforementioned challenges. The foregoing discussion is intended only to illustrate examples of the present field and should not be taken as a disavowal of scope.

SUMMARY

In embodiments, a fuel tank inerting system includes a cabin air source, a conduit, a heat exchanger, and a pressurized air source. With embodiments, the pressurized air source is configured to provide pressurized air to the heat exchanger, and the conduit is configured to provide cabin air from the cabin air source to the heat exchanger.

Among other things, utilization of aircraft cabin air exhaust flow as a part of the cooling medium for heat exchangers to cool compressed source air can, among other things, reduce aircraft drag, and/or improve overall aircraft performance and efficiency.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
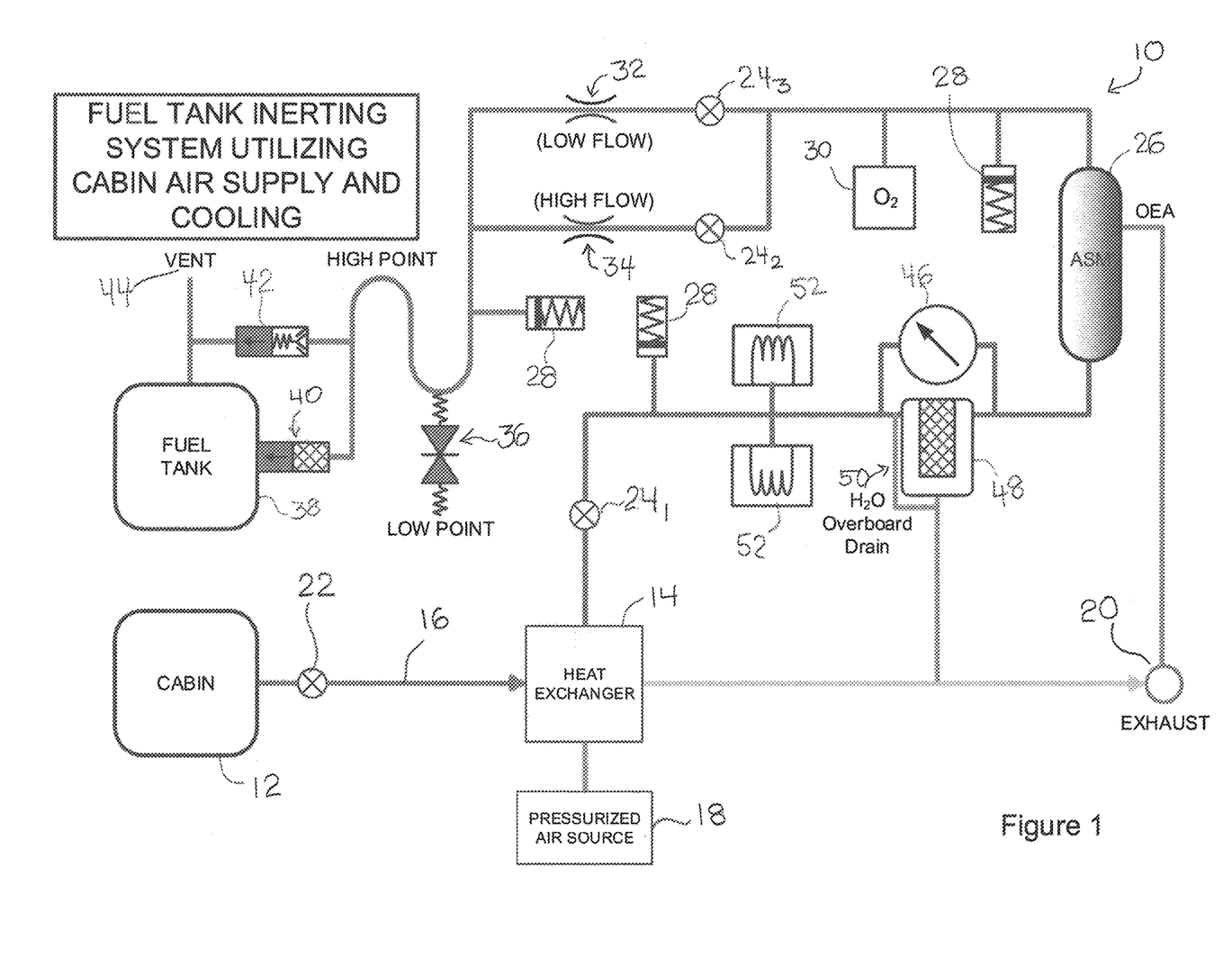
FIG. 1 is a schematic representation of a first embodiment of a fuel tank inerting system according to teachings of the present disclosure.
Figure 2:
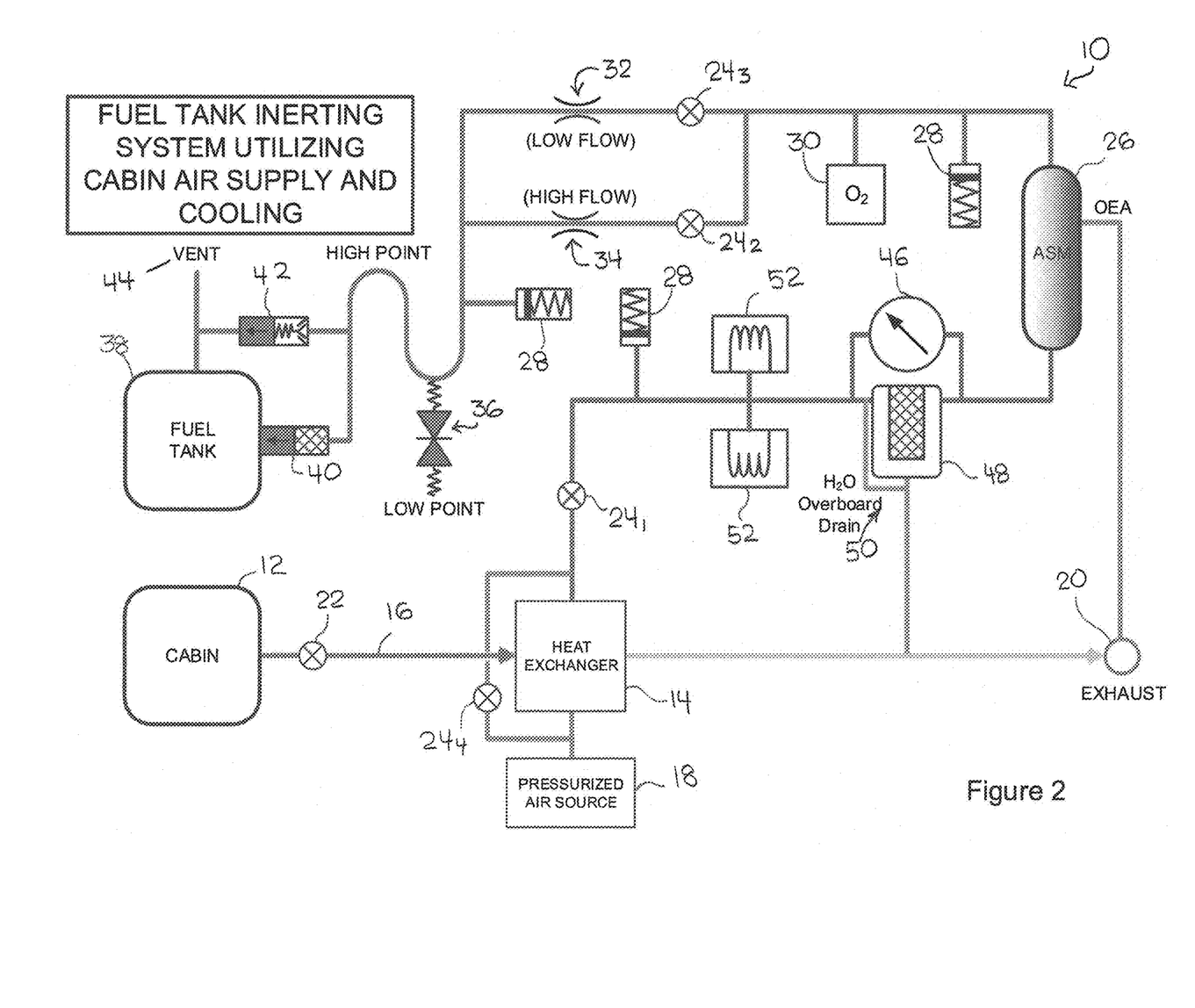
FIG. 2 is a schematic representation of a second embodiment of a fuel tank inerting system according to teachings of the present disclosure.
Figure 3:
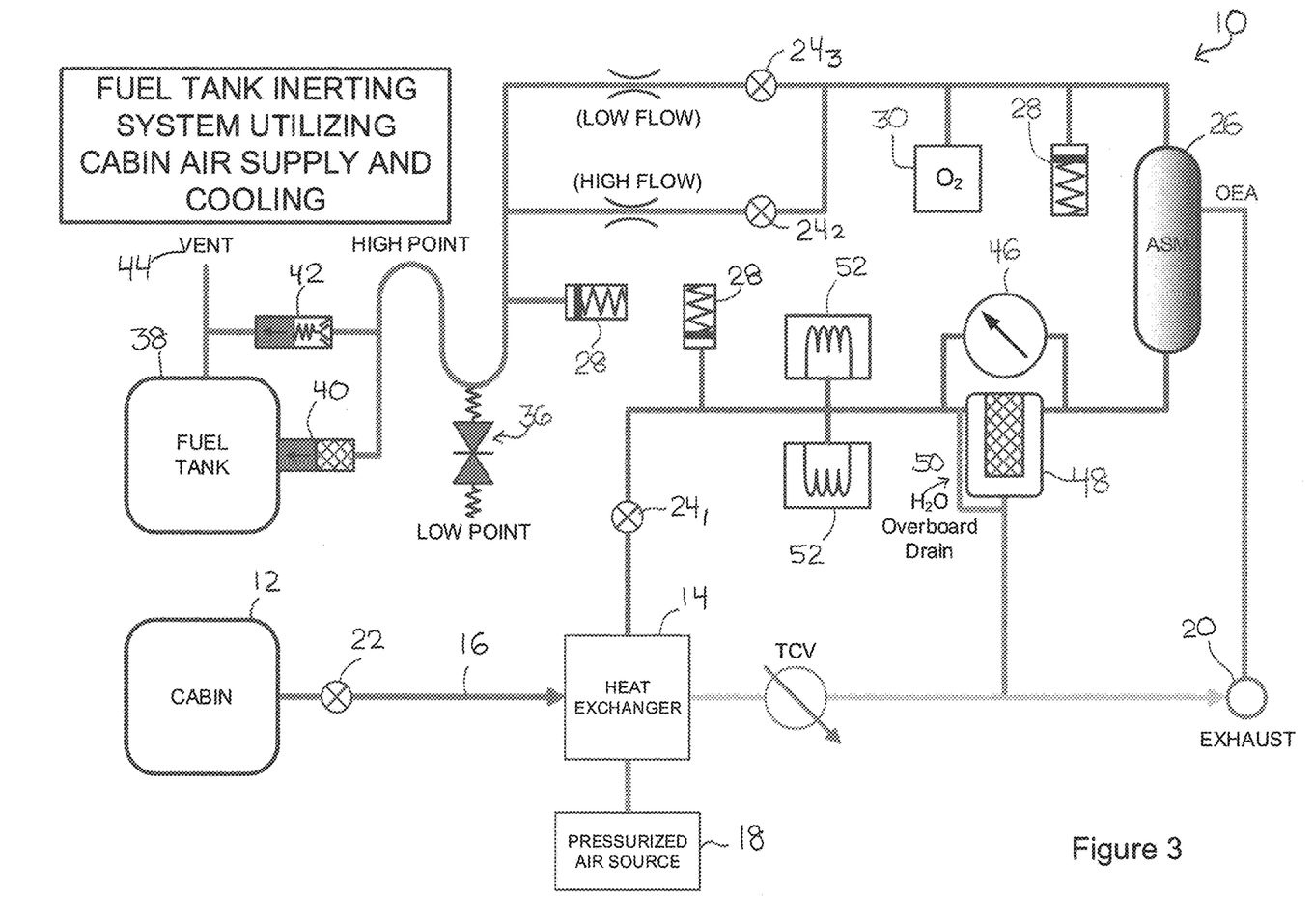
FIG. 3 is a schematic representation of a third embodiment of a fuel tank inerting system according to teachings of the present disclosure.
Figure 4:
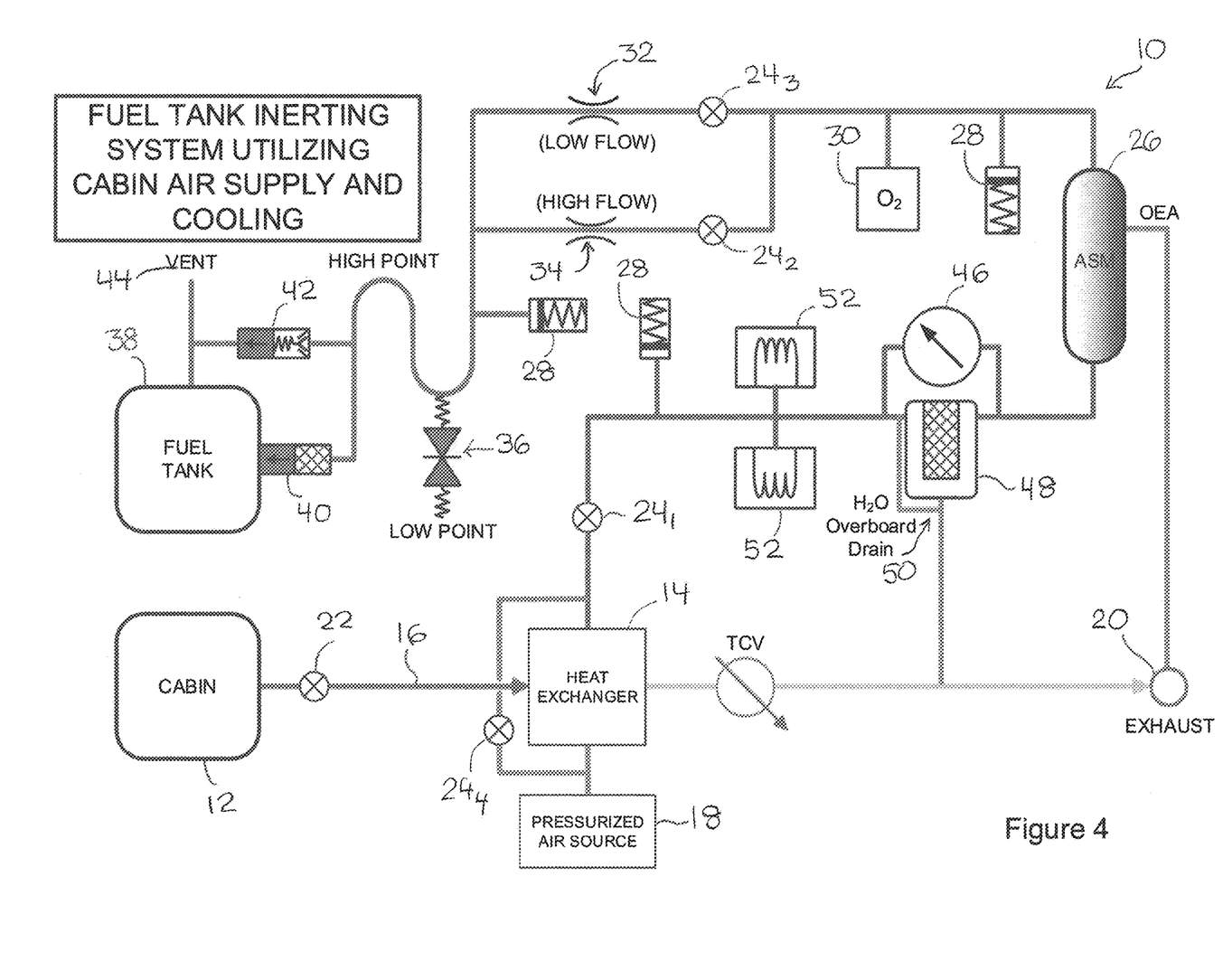
FIG. 4 is a schematic representation of a fourth embodiment of a fuel tank inerting system according to teachings of the present disclosure.
Figure 5:
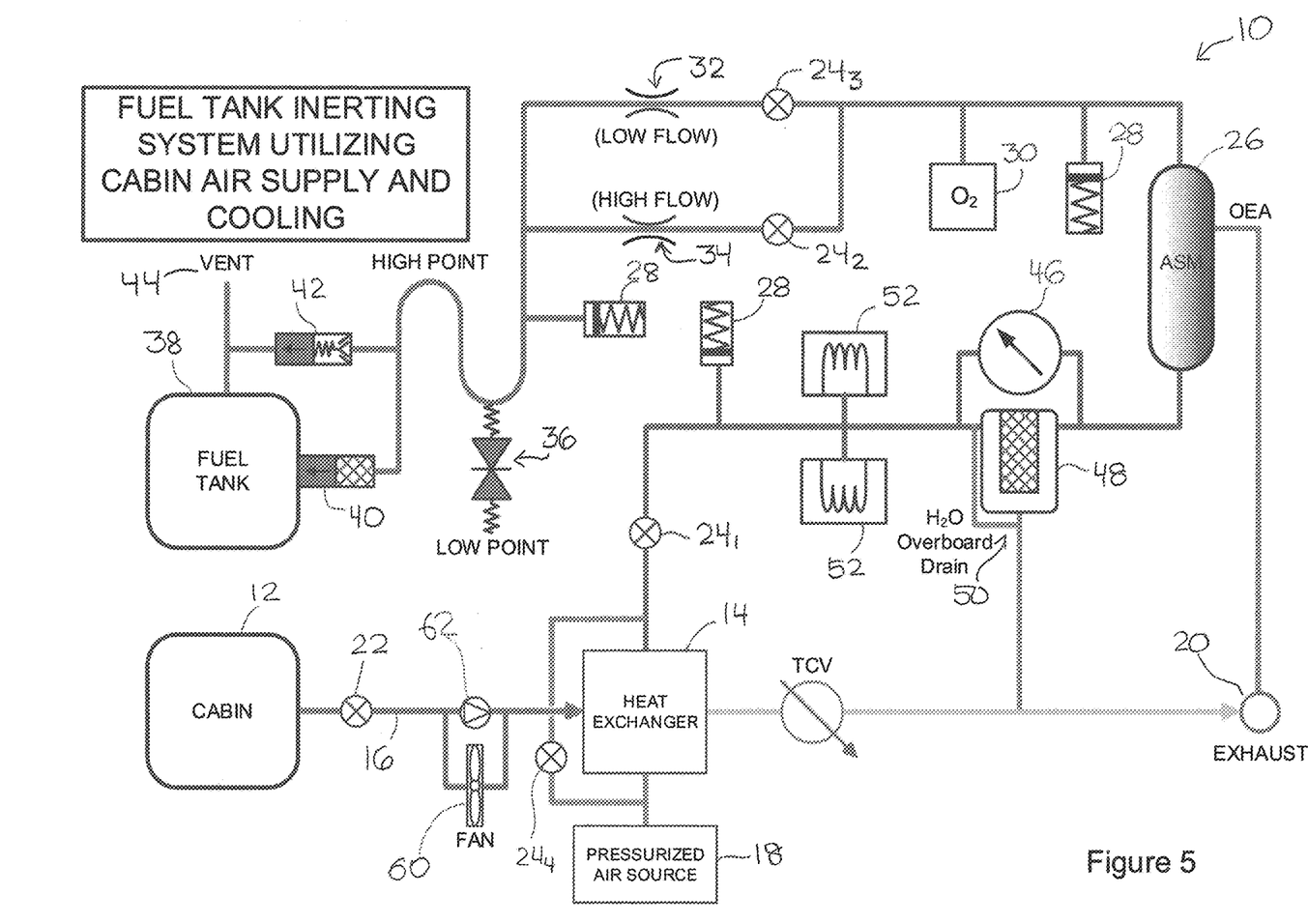
FIG. 5 is a schematic representation of a fifth embodiment of a fuel tank inerting system according to teachings of the present disclosure.

FIG. 1 generally illustrates a schematic representation of an embodiment of a fuel tank inerting system 10 according to teachings of the present disclosure. Such a system may be utilized in connection with both supersonic and subsonic aircraft, and may utilize cabin air supply and cooling. As generally illustrated, air from the cabin 12 may be directly directed to a heat exchanger 14. In embodiments, a conduit 16 (e.g., a pipe or duct) from a cabin may provide for the flow of air from the cabin to a heat exchanger.

Air from a pressurized air source 18 may also be directed to the heat exchanger. In embodiments, a pressurized air source may comprise or involve, for example and without limitation, a turbine/compressor, a motor to the turbine/ compressor, and a motor controller therefor. When air is compressed, it may get hot and may need to be cooled in a heat exchanger. Moreover, with some embodiments, a pressurized air source may comprise or additionally include engine bleed air.

An exhaust 20 (or exhaust path/flow) from or following the heat exchanger 14 may be further directed to, or connected with, various other components associated with inerting systems (including, without limitation, various components/systems, and combinations thereof, such as generally illustrated in embodiments included in FIGS. 1-8).

With cabin air as a source, an air duct (associated with ambient) or ram air may not be needed. Moreover, it is noted that conventional inerting systems can waste/dump as much as 30-40% of the cabin air (which is generally around 70 degrees). As such, there can be a significant benefit in making use of waste cabin air.

Further, a nuance, or added benefit, of the disclosed system is that the cabin air may be utilized, at least in part, for cooling. For example, and as generally supported by the disclosed embodiments, a motor driving a compressor, may be jacketed, and cooling air may flow, such as through a jacket, to cool the motor.

Further, as generally illustrated in FIG. 1, a valve 22 (e.g., a cabin air isolation valve) may be provided between the cabin 12 and the heat exchanger 14. Additionally, as generally illustrated in FIG. 1, embodiments of a fuel tank inerting system 10 may include: a plurality of additional valves (e.g., $24_1$, $24_2$, $24_3$), one or more air separation modules 26, one or more pressure sensors 28, an oxygen sensor 30, a low flow orifice 32, a high flow orifice 34, a drain/pressure relief valve 36, a fuel tank 38, a flame arrestor/check valve 40, a low pressure anti-reverse flow valve 42, a vent 44, a pressure switch 46, a filter/ozone converter 48, an $H_2O$ overboard drain 50, and/or one or more temperature sensors 52.

Other embodiments of inerting systems envisioned in connection with the present disclosure are generally illustrated in FIGS. 2-8. With each embodiment a flow path of cabin air is directed to a heat exchanger. As generally illustrated in FIGS. 2 and 4-8, a flow path from a pressurized air source 18 may bypass the heat exchanger 14, and such flow path may include a valve 244.

As generally illustrated in FIGS. 5-8, a fan 60 and a check valve 62 may optionally be included in the flow path from the cabin 12 to the heat exchanger 14. Such a check valve 62 may, inter alia, prevent backflow with an associated fan. Additionally, if a fan or other components that may generate noise (e.g., cabin noise) are included in an inerting system, the amount of noise may be addressed or reduced via positioning, barriers, or other noise-reduction or dampening measures.

Further, a Motorized Ram Air Control Valve (MRACV) or a Temperature Control Valve (TCV), such as shown in the embodiments of FIGS. 3-8, may be included in a system. For example, a TCV may be included in a path between the heat exchanger 14 and an exhaust 20. However, a TCV or an MRACV may be an optional inclusion and may be eliminated from other embodiments of the present disclosure.

Figure 6:
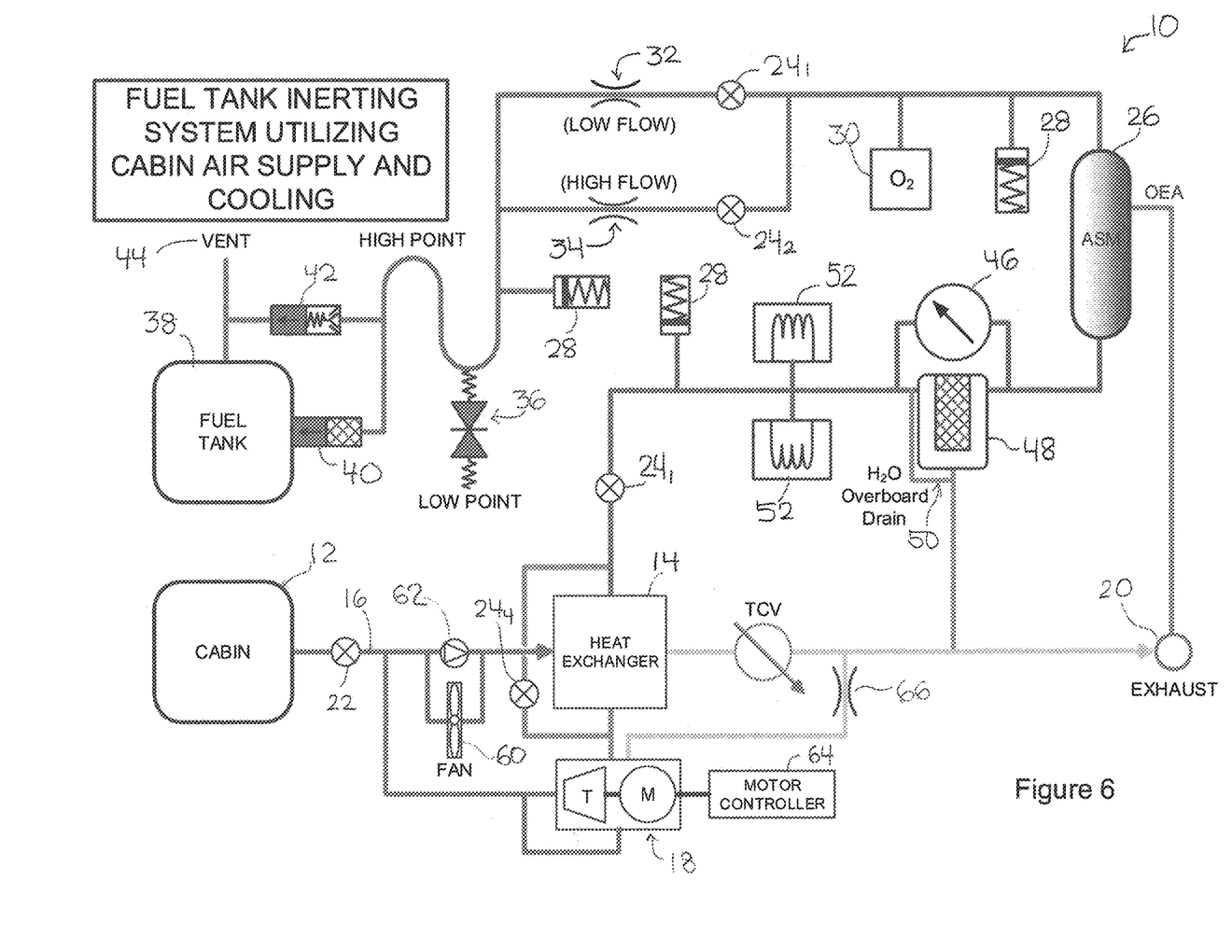
FIG. 6 is a schematic representation of a sixth embodiment of a fuel tank inerting system according to teachings of the present disclosure.
Figure 7:
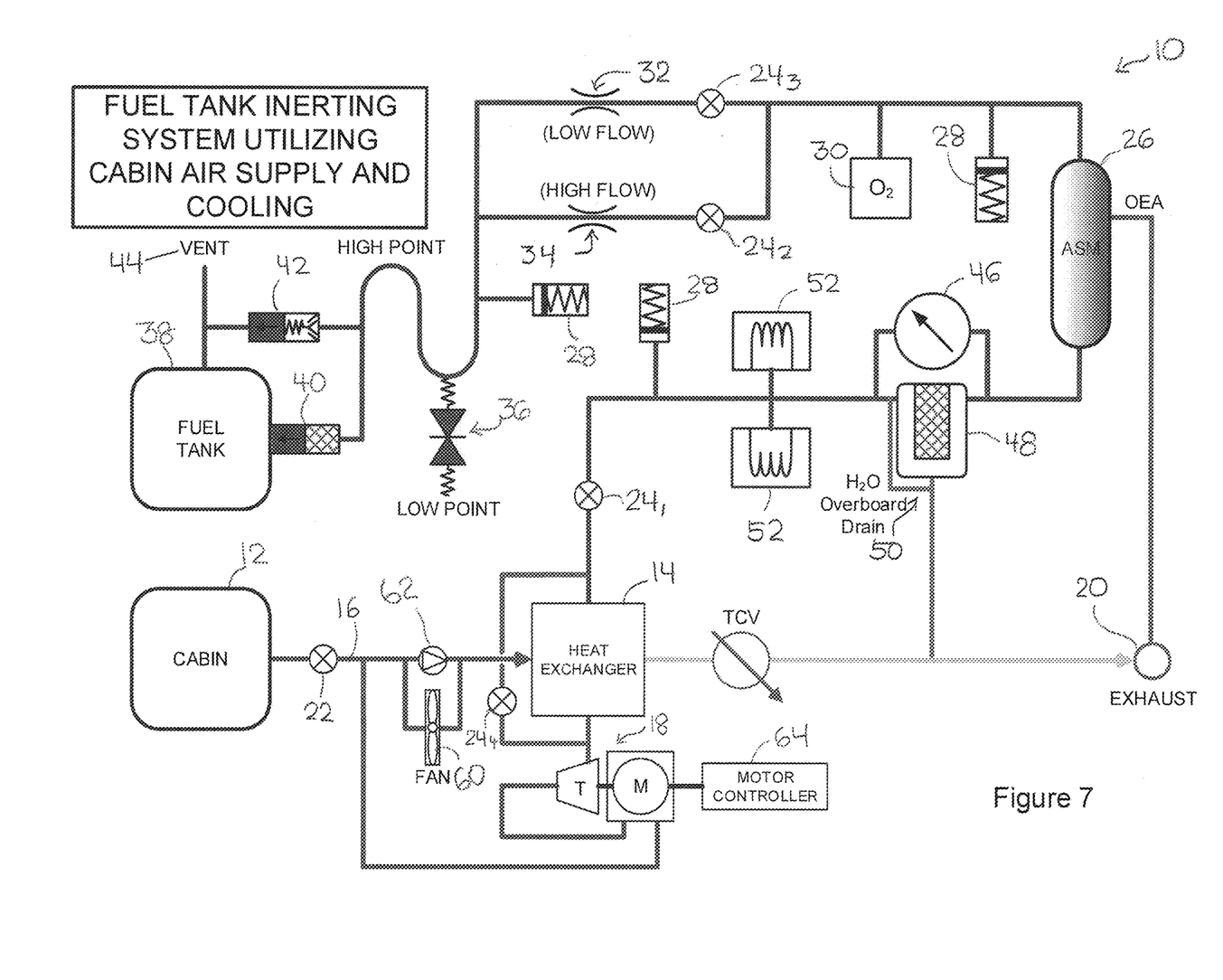
FIG. 7 is a schematic representation of a seventh embodiment of a fuel tank inerting system according to teachings of the present disclosure.
Figure 8:
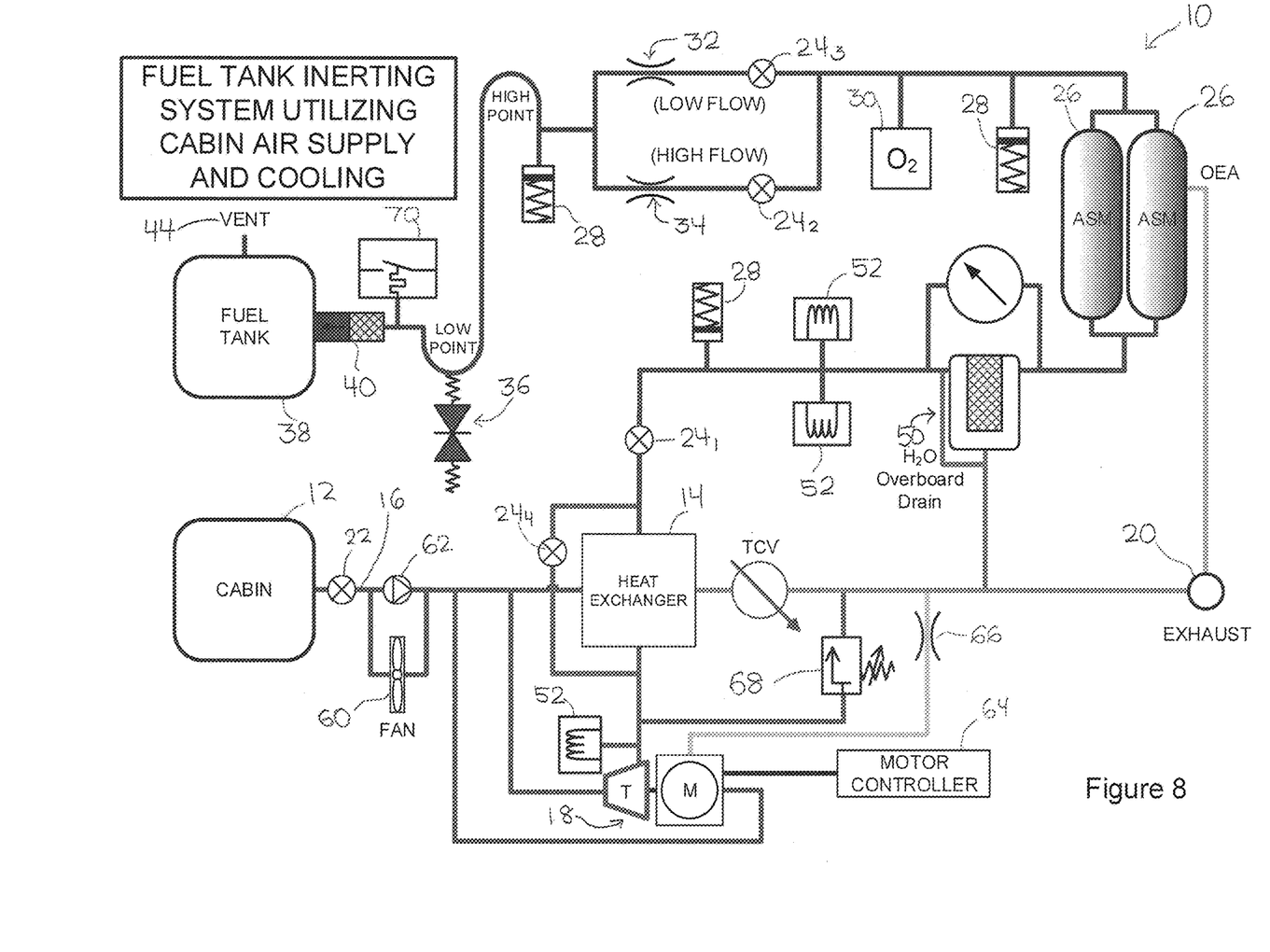
FIG. 8 is a schematic representation of an eighth embodiment of a fuel tank inerting system according to teachings of the present disclosure.

As generally illustrated in FIGS. 6-8, the pressurized air source 18 may comprise or include a turbine/compressor T, a motor M, and a motor controller 64. In embodiments, such as generally illustrated in FIGS. 6 and 8, an additional flow path from the cabin 12 may provide cooling air flow to the motor M and connect along a path between the heat exchanger 14 and the exhaust 20. The additional flow path may include a flow orifice 66.

As generally illustrated in FIG. 8, an embodiment of a fuel tank inerting system 10 may include a surge relief valve 68 that may be provided along a path from the pressurized air source 18 that connects to a path that extends between the TCV and exhaust 20; and may include a thermal switch 70 that may be provided in proximity to a flame arrestor/check valve 40 associated with the fuel tank 38.

Moreover, it is noted that certain valves shown in the various embodiments may be moved to other positions or location and/or additional valves could be included at various positions or locations.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A fuel tank inerting system, comprising:
a cabin air source;
a conduit;
a heat exchanger;
a pressurized air source that is configured to provide pressurized air to the heat exchanger;
an air separation module configured to connect to the heat exchanger;
a low flow orifice configured to connect to the air separation module via a first valve;
a high flow orifice configured to connect to the air separation module via a second valve, the high flow orifice being in parallel with the low flow orifice; and
a fuel tank configured to connect to the low flow orifice and the high flow orifice;
wherein the conduit is configured to provide cabin air from the cabin air source to the heat exchanger.

2. The system of claim 1, wherein the pressurized air source includes a turbine or compressor.

3. The system of claim 2, wherein the pressurized air source further includes a motor.

4. The system of claim 3, wherein the pressurized air source further includes a motor controller.

5. The system of claim 1, including an exhaust path from the heat exchanger.

6. The system of claim 1, wherein the system is included with a supersonic aircraft.

7. The system of claim 1, wherein the system is included with a subsonic aircraft.

8. The system of claim 1, wherein the pressurized air from the pressurized air source is cooled in the heat exchanger.

9. The system of claim 1, wherein the pressurized air includes engine bleed air.

10. The system of claim 1, wherein an exhaust path from or following the heat exchanger is directed or connected to other system components.

11. The system of claim 1, wherein the system functions with the cabin air and does not utilize air provided by an air duct from ambient or ram air.

12. The system of claim 1, wherein the cabin air is utilized, at least in part, for cooling.

13. The system of claim 1, wherein a motor driving a compressor includes a jacket, and cooling air flows through the jacket to cool the motor.

14. The system of claim 1, including a check valve provided between the cabin air source and the heat exchanger.

15. The system of claim 1, wherein the system includes one or more valves, one or more pressure sensors, an oxygen sensor, a drain/pressure relief valve, a flame arrestor/check valve, a low pressure anti-reverse flow vent valve, a vent, a pressure switch, a filter/ozone converter, an $H_2O$ overboard drain, and/or one or more temperature sensors.

16. The system of claim 1, wherein a flow path from the pressurized air source bypasses the heat exchanger.

17. The system of claim 1, including a Motorized Ram Air Control Valve (MRACV) or a Temperature Control Valve (TCV).

18. The system of claim 1, including a Temperature Control Valve (TCV) included in a path between the heat exchanger and an exhaust.

19. The system of claim 1, including a surge relief valve provided along a path from the pressurized air source that connects a path that extends from a Temperature Control Valve (TCV) and an exhaust.

20. The system of claim 19, including a thermal switch provided in proximity to a flame arrestor/check valve connected to the fuel tank.

21. The system of claim 1, further comprising:
a filter/ozone converter configured to connect between the air separation module and the heat exchanger;
a pressure switch configured to connect between the air separation module and the heat exchanger, the pressure switch being in parallel with the filter/ozone converter; and
a first temperature sensor configured to connect between the filter/ozone converter and the heat exchanger.

22. The system of claim 21, further comprising:
an $H_2O$ overboard drain configured to detour around the filter/ozone converter;
a first pressure sensor configured to connect between the first temperature sensor and the heat exchanger; and
a third valve configured to connect between the first pressure sensor and the heat exchanger.

23. The system of claim 1, further comprising:
an oxygen sensor configured to connect between the air separation module and the fuel tank;
a second pressure sensor configured to connect between the air separation module and the oxygen sensor; and
a third pressure sensor configured to connect between the fuel tank and the oxygen sensor.

24. The system of claim 1, further comprising:
a drain/pressure relief valve configured to connect between the low flow orifice and the fuel tank; and
a flame arrestor/check valve configured to connect between the drain/pressure relief valve and the fuel tank.

25. The system of claim 24, further comprising:
a vent connect to the fuel tank; and
a low pressure anti-reverse flow vent valve configured to connect between the drain/pressure relief valve and the vent.

26. The system of claim 1, further comprising:
a fan configured to connect between the cabin air source and the heat exchanger; and
a cabin air isolation valve configured to connect between the cabin air source and the fan.

27. The system of claim 1, further comprising:
an additional flow path from the cabin air source, the additional flow path is configured to extend between the pressurized air source and an exhaust path, and wherein the exhaust path extends between the heat exchanger and an exhaust.

28. The system of claim 27, further comprising:
a second temperature sensor configured to located between the pressurized air source and the heat exchanger; and
a surge relief valve located between the second temperature sensor and the exhaust path.

29. A fuel tank inerting system, comprising:
a cabin air source;
a conduit;
a heat exchanger; and
a pressurized air source that is configured to provide pressurized air to the heat exchanger;
wherein the conduit is configured to provide cabin air from the cabin air source to the heat exchanger; and
wherein the system includes one or more valves, one or more air separation modules, one or more pressure sensors, an oxygen sensor, a low flow orifice, a high flow orifice, a drain/pressure relief valve, a fuel tank, a flame arrestor/check valve, a low pressure anti-reverse flow vent valve, a vent, a pressure switch, a filter/ozone converter, an $H_2O$ overboard drain, and/or one or more temperature sensors.

* * * * *